3,272,823
α-HYDROXY DERIVATIVES OF DIHYDRO-D-LY-
   SERGIC AND 1 - METHYL - DIHYDRO-D-LYSER-
   GIC ETHYLAMIDES
Federico Arcamone, Milan, Italy, and Aldo Ferretti,
   Washington, D.C., assignors to Società Farma-
   ceutici Italia, Milan, Italy, a corporation of Italy
No Drawing. Filed Oct. 23, 1964, Ser. No. 406,190
Claims priority, application Italy, July 13, 1962,
   14,099/62; Dec. 5, 1962, 23,917/62; Oct. 28, 1963,
   22,092/63
        18 Claims. (Cl. 260—285.5)

This is a continuation-in-part of our application Serial No. 295,289, filed July 11, 1963, and relates to therapeutically useful derivatives of dihydro-D-lysergic and 1-methyl-dihydro-D-lysergic acid and to a process of their preparation.

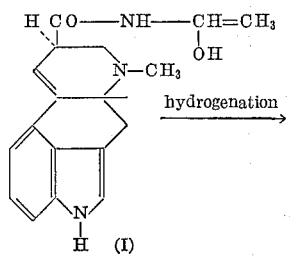
(I)

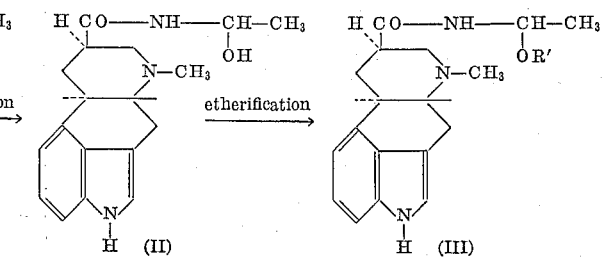
(II)        (III)

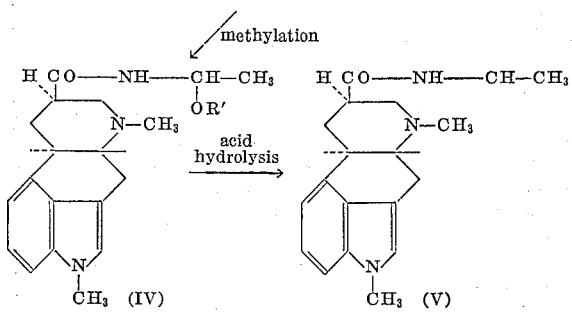
(IV)        (V)

The new compounds of the invention have the formula:

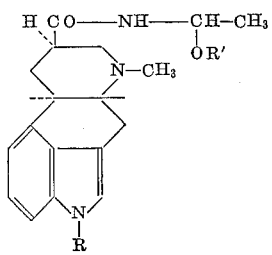

wherein

R is selected from the group consisting of hydrogen and methyl, and

R' is selected from the group consisting of hydrogen; β - (N - carbobenzoxy) - L - alanylhydrazide; saturated cycloalkyl with from 5 to 6 carbon atoms in the ring; substituted and unsubstituted saturated alkyl having from 1 to 6 carbon atoms wherein the substituent is selected from the group consisting of hydroxy, alkoxy, halogen, phenyl, amino and acylamino
   wherein the acyl is selected from the group consisting of a radical of a saturated aliphatic carboxylic acid with from 1 to 9 carbon atoms, phenylcarbonic acid, benzoic acid, nicotinic acid and isonicotinic acid.

The products of the invention show a good hypotensive, vasodilatory, and antienteraminic activity and an activity on the central nervous system, and have a low toxicity as is hereinafter shown by comparative pharmacological tests.

The process of the invention represented by the following reaction scheme comprises catalytically hydrogenating D - lysergic acid α - hydroxyethylamide (I) to dihydro-D - lysergic acid α - hydroxyethylamide (II), from which the corresponding O-substituted derivatives (III) can be obtained by etherification of the hydroxyl group with a suitable alcohol.

The O-substituted derivatives of dihydro-D-lysergic acid α-hydroxyethylamide (III), thus obtained, may be methylated in the 1-position to yield O-substituted derivatives of 1 - methyl - dihydro - D - lysergic acid α - hydroxyethylamide (IV), from which by acid hydrolysis, 1-methyl-dihydro - D - lysergic acid α - hydroxyethylamide (V) is obtained.

wherein R' is a radical with the above meaning.

D - lysergic acid α - hydroxyethylamide (I), the starting material form the process of the invention, is known from the literature, British Patent No. 883,330, and may be obtained by extraction with a suitable organic solvent from the fermentation broths obtained by culturing virulented strains of *Claviceps paspali*, Stevens and Hall, in submerged culture with the previous elimination of the mycelium at from 0 to 10° C. and at a pH of from 7 to 9, and separation of the α-hydroxyethylamide contained in the extract.

The preparation of dihydro - D - lysergic acid α - hydroxy-ethylamide (II) takes place by catalytic hydrogenation of D - lysergic acid α - hydroxy - ethylamide (I) in acid aqueous solution in the presence of a catalyst, such as platinum oxide or palladium over charcoal. It may be carried out at room temperature and under atmospheric pressure. When the hydrogenation reaction is over, the catalyst is separated and the resulting dihydro-D-lysergic acid α-hydroxyethylamide (II) is extracted from the remaining solution with a suitable organic solvent, such as chloroform, ethyl acetate or their analogues, the pH of the solution being adjusted to 7–8. By further evaporation of the solvent, dihydro-D-lysergic acid α-hydroxy-ethylamide (II) is isolated and optionally further purified by recrystallization from organic solvents.

The etherification reaction for transforming the hydroxy group of dihydro-D-lysergic acid α-hydroxyethylamide (II) to an O-substituted derivative (III) is carried out by reacting dihydro - D - lysergic acid α - hydroxyethylamide (II) with the appropriate alcohol having the formula R'OH, wherein R' has the meaning defined above in connection with the general formula.

The reaction is performed in the presence of an acid, preferably an organic acid, such as maleic, tartaric, or oxalic acid. The reaction mixture is refluxed at the boiling temperature of the alcohol for a period from 30 minutes to 4 hours, the solution evaporated in vacuo to dryness, the residue suspended in a slightly alkaline aqueous solution and extracted with an organic solvent, such as chloroform or ethyl acetate.

The extract thus obtained contains the two stereoisomers of the O-alkyl or O-substituted derivative of dihydro-D-lysergic acid α-hydroxyethylamide (III) hereinafter called stereoisomers "A" and "B": the "A" stereoisomer being the less soluble in organic solvents and the "B" stereoisomer the more soluble. The two stereoisomers may be separated by concentration of the extracts to a tenth of their starting volume. A first crop consisting of stereoisomer A separates, and then by further concentration a second crop, consisting of stereoisomer B, separates.

The O-substituted derivatives of dihydro-D-lysergic acid α-hydroxyethylamide (III) obtained according to the above process may be prepared according to a process equivalent to that preceding which consists of etherification of D-lysergic acid α-hydroxyethylamide with a suitable alcohol and following catalytic hydrogenation of the O-substituted derivative of D-lysergic acid α-hydroxyethylamide, thus obtained. In this manner, instead of etherifying the compound II, obtained by hydrogenation of D-lysergic acid α-hydroxyethylamide, this last compound is directly etherified and the resulting O-substituted derivative of D-lysergic acid α-hydroxyethylamide is hydrogenated. The etherification reaction of D-lysergic acid α-hydroxyethylamide is carried out according to that above described for the analogous etherification reaction.

The hydrogenation reaction of the O-substituted derivatives of D-lysergic acid α-hydroxyethylamide is carried out in an organic solvent, such as dioxane, in the presence of a reduction catalyst, such as platinum oxide or palladium over charcoal. The reaction is carried out at a temperature of from room temperature to 60° C. and at a pressure of from the atmospheric one up to 60 atmospheres. When the hydrogenation reaction is over, the catalyst is separated and the O-substituted derivative of dihydro-D-lysergic acid α-hydroxy-ethylamide is isolated from the remaining solution by evaporation of the solvent.

By methylation of the O-alkyl or O-substituted derivatives of dihydro-D-lysergic acid α-hydroxyethylamide (stereoisomers A and B), the corresponding substituted 1-methyl compounds (IV) are obtained. The methylation may comprise reacting the O-substituted derivative of dihydro-D-lysergic acid α-hydroxyethylamide (III) with a methyl halide, preferably methyl iodide, in liquid ammonia and in the presence of metallic potassium. The 1-methyl derivative thus obtained is extracted with an organic solvent, such as chloroform, and separated by evaporation of the solvent followed by crystallization.

1-methyl-dihydro-D-lysergic acid a-hydroxyethylamide (V) may be prepared by reacting the O-substituted derivative of 1-methyl-dihydro-D-lysergic acid (IV) with an aqueous mineral acid, preferably with an aqueous hydrochloric acid solution at room temperature. From the solution thus obtained, made alkaline, the resulting product is extracted with a solvent, preferably chloroform. The extracts are evaporated, and the residue purified by crystallization, preferably from ethyl acetate.

Typical examples of O-alkyl derivatives of dihydro-D-lysergic acid α-hydroxyethylamide are the O-methyl, O-ethyl, O-propyl, O-isopropyl, O-isobutyl, O-pentyl, O-2-methylpentyl, O-hexyl, O-β-hydroxyethyl, and O-γ-hydroxybutyl derivatives.

Typical examples of O-substituted derivatives of dihydro-D-lysergic and 1-methyl-dihydro-D-lysergic acid α-hydroxyethylamide are O-hydroxypropyl-, O-hydroxybutyl-, O-methoxyethyl-, O-methoxypropyl-, O-methoxybutyl-, O-chloroethyl-, O-chloropropyl-, O-chlorobutyl-, O-bromoethyl-, O-aminoethyl-, O-phenylethyl-, O-phenylbutyl-, O-cyclopentyl-, O-cyclohexyl-, O-formyl-aminoethyl-, O-formyl-aminopropyl-, O-acetamidoethyl-, O-acetamidobutyl-, O-propionamidoethyl-, O-benzamidoethyl-, O-benzamidopropyl-, O-carbobenzoxy-amino-ethyl-, O-nicotinoylaminoethyl-, O-benzyl and N-carbobenzoxy-L-alanyl hydrazide.

The products of the invention are crystalline solids soluble in the usual organic solvents. At low doses (2–45 mg./kg. according to the animal species) they abolish the depression caused by reserpine in mouse, rat, cat and dog. In the mouse they potentiate (at doses of about 1–5 mg./kg.) the barbiturate narcosis and diminish the attitudes of rats instructed to carry out works which require memory and recognition of forms.

They may be administered either orally, intramuscularly, subcutaneously or intravenously. The products of the invention have been employed in the clinic generally in all forms of hypertension, heart diseases, affection of blood vessels, tachycardia, migraine, cephalea and may be used, also in psychiatry, as antidepressive, sedative and psychical equilibrating drugs. Preferably they are used in endogenous depressions, in the depressions consequent on involuted processes and organic alterations, in the depressive phase of the manic-depressive psychosis, in depressions of psychasthenic and neurotic origin, in depressions from psycho-vegetative exhaustion and in depressive dysthymia.

The therapeutic compositions of the invention which are usually employed include one or more compounds of the invention with a solid or liquid pharmacologically acceptable vehicle. The compositions may be tablets, powders, pills or other pharmaceutical forms suitable to oral administration. Liquid diluents properly sterilized should be employed for parenteral administration. Excipients may be used, among which the most suitable are: starch, lactose, talc, magnesium stearate and their analogues.

The following examples serve to illustrate, but not to limit, the invention.

EXAMPLE 1

*Dihydro-D-lysergic acid α-hydroxyethylamide (II)*

9 g. of D-lysergic acid α-hydroxyethylamide (I) are dissolved in 240 cc. of distilled water containing 4.5 g. of tartaric acid. To this solution, 4.5 g. of platinum oxide are added and the whole is hydrogenated at room temperature and under atmospheric pressure. Thereupon (after 2 hours, when 2000–2100 cc. of hydrogen have been absorbed at 22° C.) the catalyst is separated by centrifuging and the clarified solution is shaken with 150 cc. of chloroform after the addition of 10 g. of sodium bicarbonate. The crystalline product, which results after distilling off the solvent, is collected and dried over phosphoric anhydride, in vacuo. The product may be recrystallized from chloroform-ethanol (9:1), from ethyl acetate, from acetone or from ether-methanol. It retains easily and tenaciously some mols of solvent of crystallization.

Dihydro-D-lysergic acid α-hydroxyethylamide melts with decomposition at 130° C.; $[\alpha]_D^{23°} = -98 \pm 2$ (c.=1.0 in ethanol) $\lambda_{max}$ 225 and 282 mμ.

EXAMPLE 2

*Dihydro-D-lysergic acid α-methoxyethylamide (III)*

The solution obtained from 7.8 g. of dihydro-D-lysergic acid α-hydroxyethylamine (II) prepared as described in Example 1, and 2.3 g. of caleic acid in 100 cc. of methyl alcohol is refluxed for 2 hours and 30 minutes. After cooling, the acid is neutralized with sodium bicarbonate and evaporated to dryness in vacuo. The residue is taken up with saturated sodium bicarbonate solution and the suspension is repeatedly extracted with chloroform. The extracts, combined and dried over anhydrous sodium sulfate, are concentrated to a tenth of the starting volume and 2.94 g. of stereoisomer A of dihydro-D-lysergic acid α-methoxyethylamide (III) are thus precipitated. The stereoisomer A is removed by filtration, and by further concentration of the filtrate 0.98 g. of stereoisomer B are obtained.

The stereoisomer A is recrystallized from ethyl acetate to obtain 2.64 g. of pure product melting at 225° C. with decomposition:

$$[\alpha]_D^{23°} = -68° \pm 4° \quad (c.=0.25 \text{ in ethanol})$$

By recrystallization of the stereoisomer B from ethyl acetate 560 mg. of pure product are obtained melting at 218° C. with decomposition; $[\alpha]_D^{23°} = -68° \pm 4°$ (c.=0.25 in ethanol).

EXAMPLE 3

*Dihydro-D-lysergic acid α-ethoxyethylamide (III)*

The solution obtained from 3.4 g. of dihydro-D-lysergic acid α-hydroxyethylamide (II) and 1.0 g. of maleic acid in 50 cc. of anhydrous ethanol is refluxed for 1 hour and 30 minutes. After operating as described in Example 2, 0.90 g. of stereoisomer A of dihydro-D-lysergic acid α-ethoxyethylamide (III) and 0.84 g. of stereoisomer B are obtained.

By recrystallizing stereoisomer A from ethyl acetate, 693 mg. of pure product melting at 213–214° C. with decomposition is obtained:

$$[\alpha]_D^{20°} = -90° \pm 5° \quad (c.=0.2 \text{ in ethanol})$$

By recrystallizing stereoisomer B from ethyl acetate, there are obtained 0.58 g. of pure product melting at 198–199° C. with decomposition; $[\alpha]_D^{20°} = -95° \pm 5°$ (c.=0.2 in ethanol).

O-isopropyl, O-isobutyl, O-pentyl and O-hexyl derivatives of dihydro-D-lysergic acid are prepared in analogous manner as described in Examples 2 and 3.

EXAMPLE 4

*1-methyl-dihydro-D-lysergic acid α-methoxyethylamide (IV)*

5 millimols of dihydro-D-lysergic acid α-methoxyethylamide (stereoisomer A or B) are dissolved in 30 cc. of liquid ammonia, in which 270 mg. of metallic potassium (1.4 equivalents) have been previously dissolved. After 30 minutes of stirring, 994 mg. (1.4 equivalents) of methyl iodide in 1 cc. of anhydrous ethyl ether are added. Stirring is carried out for a further 30 minutes and the ammonia is then evaporated off at room temperature. The residue is extracted with chloroform and 1-methyl-dihydro-D-lysergic acid α-methoxyethylamide obtained by evaporation of the solvent crystallized from ethyl acetate.

The stereoisomer A melts at 227–228° C.;

$$[\alpha]_D^{20°} = -80° \pm 4° \quad (c.=0.25 \text{ in ethanol})$$

The stereoisomer B melts at 218–219° C.;

$$[\alpha]_D^{20°} = -84° \pm 4° \quad (c.=0.25 \text{ in ethanol})$$

EXAMPLE 5

*1-methyl-dihydro-D-lysergic acid α-ethoxyethylamide (IV)*

Dihydro-D lysergic acid α-ethoxyethylamide is methylated in analogous manner to that described in Example 4. 1-methyl-dihydro-D-lysergic acid α-ethoxyethylamide is obtained. The stereoisomer A melts at 224–225° C. with decomposition; $[\alpha]_D^{20°} = -94.6° \pm 5°$ (c.=0.22 in ethanol).

The stereoisomer B melts at 216–217° C. with decomposition; $[\alpha]_D^{20°} = -90.1° \pm 5°$ (c.=0.22 in ethanol).

EXAMPLE 6

*1-methyl-dihydro-D-lysergic acid α-hydroxyethylamide (V)*

A solution of 770 mg. of 1-methyl-dihydro-D-lysergic acid α-methoxyethylamide (IV) in 45 cc. of 1 N hydrochloric acid is prepared and kept for 5 minutes at room temperature. It is then diluted with 30 cc. of distilled water, made alkaline with sodium bicarbonate and extracted four times with chloroform. By evaporation of the solvent, an amorphous residue (750 mg.) is obtained, which is then crystallized from ethyl acetate. The product melts at 240–241° C. with decomposition;

$$[\alpha]_D^{20°} = -75° \pm 5° \quad (c.=0.20 \text{ in ethanol})$$

EXAMPLE 7

*Dihydro-D-lysergic acid α-(β-hydroxyethoxy)-ethylamide (III)*

20 g. of dihydro-D-lysergic acid α-hydroxyethylamide (II) are reacted with 12 g. of maleic acid, 100 cc. of dimethylformamide and 100 cc. of ethylene glycol, keeping the mixture stirred for 1 hour and 30 minutes at 70° C. After cooling and washing with ether, the mixture is taken up with distilled water, made alkaline and extracted with n-butanol. After evaporating the solvent in vacuo an oil is obtained, from which by fractional crystallization from acetone, 6 g. of stereoisomer A of dihydro-D-lysergic acid α-(β-hydroxyethoxy)-ethylamide separate, melting at 231–232° C.; $[\alpha]_D^{20°} = -75° \pm 2°$ (c.=1% in 96% ethanol), and 4 g. of stereoisomer B which, by recrystallization from ethyl acetate, melts at 209–212° C.; $[\alpha]_D^{20°} = -48° \pm 2°$ (c.=1% in 96% ethanol) which crystallizes with one molecule of ethyl acetate.

EXAMPLE 8

*1-methyl-dihydro-D-lysergic acid α-(β-hydroxyethoxy)-ethylamide (IV)*

A potassium-amide solution is prepared from 300 cc. of liquid ammonia and 1.170 g. of potassium. When the solution discolors, 6 g. of dihydro-D-lysergic acid α-(β-hydroxyethoxy)-ethylamide (stereoisomer A or B) (III), finely milled and dried, are added. The mixture is stirred for 30 minutes and 3.8 g. of methyl iodide in 30 cc. of anhydrous ether are added. The solution is stirred for a further 30 minutes at from −50° to −60° C. and then the ammonia is allowed to evaporate at room temperature. The solid residue is taken up with 200 cc. of water and extracted three times with chloroform. The solvent is evaporated in vacuo and the residue is recrystallized from acetone to give 4.8 g. of 1-methyl-dihydro-D-lysergic acid α-(β-hydroxyethoxy)-ethylamide (stereoisomer A) melting at 220–222° C.; $[\alpha]_D^{20°} = -85° \pm 2°$ (c.=1% in 96% ethanol).

In the same manner from the stereoisomer B of compound III, 2.3 g. of stereoisomer B of compound IV are obtained, melting at 227–228° C.; $[\alpha]_D^{20°} = 60° \pm 2°$ (c.=1% in 96% ethanol).

EXAMPLE 9

*Dihydro-D-lysergic acid α-(2'-acetamido-ethoxy)-ethylamide (III)*

10 g. of dihydro-D-lysergic acid α-hydroxyethylamide are mixed with 55 g. of N-acetylamino ethanol and 4.5 g. of maleic acid. After stirring for one hour at 75° C., the reaction mixture is cooled and diluted with 250 cc. of water. The mixture is made alkaline with sodium bicarbonate, and extracted with methylene dichloride, and the extract is evaporated in vacuo. The residue is crystallized from acetone. 1.6 g. of the isomer A, melting at 227–230° C., are obtained. The acetone filtrate, decolorized with carbon and concentrated, gives 1.7 g. of isomer B, melting at 205–210° C.

EXAMPLE 10

*Dihydro-D-lysergic acid α-(2'-phenylethoxy)-ethylamide (III)*

A mixture of 1 g. of dihydro-D-lysergic acid α-hydroxyethylamide, 10 cc. of 2-phenylethyl alcohol and 0.6 g. of maleic acid is stirred for one hour and a half at 70° C. After cooling, the mixture is shaken three times with a small amount of diethyl ether, the solvent being separated by decantation each time. The remaining oil is dissolved in 20 cc. of water containing 5% of bicarbonate and extracted with methylene dichloride. The organic solution is evaporated in vacuo. The residue is crystallized from diethyl ether. 350 mg. of dihydro-D-lysergic acid α-(2'-phenylethoxy)-ethylamide are obtained (mixture of the isomers A and B), melting at 167–170° C.; $[\alpha]_D^{20°}=-54°$ (c.=1 in 96% ethanol).

From the isomer mixture two isomers may be separated as outlined above.

EXAMPLE 11

*1-methyl-dihydro-D-lysergic acid α-(2'-acetamidoethoxy)-ethylamide (IV)*

2.6 g. of dihydro-D-lysergic acid α-(2'-acetamidoethoxy)-ethylamide (isomer A) are added to 150 cc. of liquid ammonia containing 0.51 g. of metallic potassium. After half an hour of stirring at −40° C., 1.64 g. of methyl iodide in 5 cc. of anhydrous diethyl ether are added and stirring is carried on for a further 30 minutes at −40° C. The ammonia is evaporated at room temperature and the residue taken up with water is extracted with methylene dichloride. The extract is evaporated in vacuo and the residue is taken up with acetone and filtered. On crystallization from acetone, 1.3 g. of the product is obtained melting at 219–220° C.;

$$[\alpha]_D^{20°}=-50°$$

(c.=1 in 96% ethanol) (isomer A).

3 g. of dihydro-D-lysergic acid α-(2'-acetamidoethoxy)-ethylamide (isomer B), similarly methylated, gives 1.4 g. of the analogous 1-methylated compound (isomer B) which melts at 216–218° C.; $[\alpha]_D^{20°}=-70°$ (c.=1 in ethanol).

EXAMPLE 12

*1-methyl-dihydro-D-lysergic acid α-(2'-phenylethoxy)-ethylamide (IV)*

2 g. of dihydro-D-lysergic acid α-(2'-phenylethoxy)-ethylamide (mixture of the isomers A and B) are methylated in the 1-position as above. The residue taken up with water and chloroform, after evaporation of the solvent and crystallization from acetone gives 800 mg. of 1-methyl-dihydro-D-lysergic acid α-(2'-phenylethoxy)-ethylamide (mixture of the isomers A and B), melting at 178–180° C.; $[\alpha]_D^{20°}=-60°$ (c.=1 in ethanol). The two isomers may be separated from the mixture as outlined above.

By operating under the same conditions as described in the examples, other compounds of the above general formula have been prepared. Typical compounds are:

Dihydro-D-lysergic acid α-(3'-hydroxypropoxy)-ethylamide (mixture of isomers), melting at 182–183° C.; $[\alpha]_D^{20°}=-61°$ (c.=1 in 96% ethanol);
Dihydro-D-lysergic acid α-(2'-chloroethoxy)-ethylamide (mixture of isomers) melting at 176° C.;
Dihydro-D-lysergic acid α-(2'-aminoethoxy)-ethylamide;
Dihydro-D-lysergic acid α-cyclohexoxy-ethylamide (mixture of isomers) melting at 181–182° C.;
Dihydro-D-lysergic acid α-benzoxy-ethylamide (mixture of isomers), melting at 164–166° C.; $[\alpha]_D^{20°}=-62°$ (c.=1 in 96% ethanol);
Dihydro-D-lysergic acid α-(2'-formylamino-ethoxy)-ethylamide (isomer B), melting at 130–135° C.; $[\alpha]_D^{20°}=-51°$ (c.=1 in 96% ethanol);
Dihydro-D-lysergic acid α-(2'-benzamidoethoxy)-ethylamide (mixture of isomers), melting at 193–195° C.; $[\alpha]_D^{20°}=53°$ (c.=1 in 96% ethanol);
1-methyl-dihydro-D-lysergic acid α-(3'-hydroxypropoxy)-ethylamide (mixture of isomers), melting at 186–187° C.; $[\alpha]_D^{20°}=-79°$ (c.=1 in 96% ethanol);
1-methyl-dihydro-D-lysergic acid α-(2'-methoxyethoxy)-ethylamide (mixture of isomers), melting at 101–103° C.; $[\alpha]_D^{20°}=-84°$ (c.=1 in 96% ethanol);
1-methyl-dihydro-D-lysergic acid α-cyclohexoxyethylamide (mixture of isomers), melting at 164–166° C.; $[\alpha]_D^{20°}=-80°$ (c.=1 in ethanol);
1-methyl-dihydro-D-lysergic acid α-benzoxyethylamide (mixture of isomers), melting at 189–192° C.; $[\alpha]_D^{20°}=-79°$ (c.=1 in 96% ethanol);
1-methyl-dihydro-D-lysergic acid α-(2'-benzamidoethoxy)-ethylamide (mixture of isomers), melting at 192–194° C.;
Dihydro - D - lysergic acid α-(2'-carbobenzoxyaminoethoxy)-ethylamide;
Dihydro-D-lysergic acid α-(N-carbobenzoxy-L-serylhydrazine)-ethylamide (mixture of isomers), melting at 169–170° C.; $[\alpha]_D^{20°}=-46°$ (c.=1 in 96% ethanol);
Dihydro-D-lysergic acid α-(2'-nicotinoylaminoethoxy)-ethylamide;
Dihydro-D-lysergic acid α-(2'-methoxyethoxy)-ethylamide (mixture of isomers), melting at 171–174° C.; $[\alpha]_D^{20°}=-68°$ (c.=1 in 96% ethanol).

PHARMACOLOGY

The products of the invention show an antienteraminic, hypotensive and vasodilatory activity, are active on the central nervous system and have a low toxicity.

Their antienteraminic activity "in vitro" was determined by the method described by V. Erspamer (Arch. exp. Path. Pharmak. 1940, 196, 343) which is based on the inhibitory action on the rat's uterus contraction caused by enteramine. The antienteraminic activity "in vivo" was determined by the method of W. Doepfner and A. Cerletti (Int. Arch. Allergy 1958, 12, 89–97) which is based on 50% inhibition of the edema caused by enteramine on a rat's paw. Table 1 lists the values of antienteraminic activity of some compounds of the invention in comparison with that of α-hydroxyethyl-D-lysergamide and ergometrine maleate (taken as unity).

TABLE 1

| Compound | Antienteraminic activity | |
|---|---|---|
| | In vitro | In vivo |
| Ergometrine maleate | 1 | 1 |
| α-Hydroxyethyl-D-lysergamide | 1 | 1 |
| α-Ethoxyethyl-dihydro-D-lysergamide (stereoisomer A) | 1.5–3 | ---------- |
| α-Hydroxyethyl-1-methyl-dihydro-D-lysergamide | 3–6 | 5 |
| α-Methoxyethyl-1-methyl-dihydro-D-lysergamide (stereoisomer A) | 6–8 | ---------- |
| α-Methoxyethyl-1-methyl-dihydro-D-lysergamide (stereoisomer B) | 20–30 | 20–30 |
| α-Ethoxyethyl-1-methyl-dihydro-D-lysergamide (stereoisomer A) | 20 | 3–5 |
| α-Ethoxyethyl-1-methyl-dihydro-D-lysergamide (stereoisomer B) | 30 | 3–5 |

The toxicity of the products of the invention was determined by the methods usually employed for drugs of the lysergic acid group by administering them intravenously to the rabbit. Table 2 lists the results expressed as LD 50, i.e. the lethal dose which kills 50% of the animals under control.

The results are compared with those of ergometrine maleate and α-hydroxyethyl-D-lysergamide.

TABLE 2

| Product: | LD 50 (mg./kg.) |
|---|---|
| Ergometrine maleate | 3.5 |
| α-Hydroxyethyl-D-lysergamide | 0.75 |
| α-Hydroxyethyl-dihydro-D-lysergamide | 35 |
| α-Methoxyethyl-dihydro-D-lysergamide (stereoisomer A) | 15 |
| α-Ethoxyethyl-dihydro-D-lysergamide (stereoisomer A) | 15 |
| α-Methoxyethyl - 1 - methyl-dihydro-D-lysergamide (stereoisomer A) | 20 |
| α-Ethoxyethyl - 1 - methyl - dihydro-D-lysergamide (stereoisomer A) | 15 |
| α-Ethoxyethyl - 1 - methyl - dihydro-D-lysergamide (stereoisomer B) | 20 |

The products of the invention have a hypotensive action: an arterial pressure-drop was noticed in numerous tests on different animal species. The active doses of α-hydroxyethyl-dihydro-D-lysergamide are as follows:

| Dog | γ/kg | 100–400 |
|---|---|---|
| Cat | γ/kg | 100–1000 |
| Rat | γ/kg | 300–1000 |
| Rabbit | mg./kg | 1 |

At such doses no untoward side effects have been noticed. The above compound does not cause heart alterations. It is not adrenolytic and does not modify the vascular reflexes.

The action of α-hydroxyethyl-dihydro-D-lysergamide against the depression caused by reserpine has been determined in the mouse, rat, cat and dog:

Mice treated with 3 mg./kg. of reserpine, administered intraperitoneally, show after a few hours a marked ptosis, immobility even on stimulation, and hypothermia. 7–8 hours after the injection of reserpine, α-hydroxyethyl-dihydro-D-lysergamide was injected. Within one hour the ptosis disappeared, the temperatures rose to that of the controls and the mobility was normalized. The dose of α-hydroxyethyl-dihydro-D-lysergamide, which normalizes the behavior of the 50% of treated animals, is 40 mg./kg. The average lethal dose (LD 50) is 220 mg./kg. intraperitoneally.

Rats treated with 3 mg./kg. of reserpine, administered intraperitoneally, show a behavior similar to that of the mice. α-Hydroxyethyl-dihydro-D-lysergamide, administered intraperitoneally 14 hours after the injection of reserpine, abolishes the ptosis in 50% of the animals at a dose of 5 mg./kg. and normalizes their mobility at the dose of 45 mg./kg. The average lethal dose (LD 50) is 200 mg./kg. intraperitoneally.

1.5 mg./kg. of reserpine administered intravenously to cats caused them after 4 to 6 hours to appear immovable, and not reacting to tactile, acoustic, myotic or ptosic stimuli. α-Hydroxyethyl-dihydro-D-lysergamide, injected intravenously at a dose of 2–4 mg./kg., abolishes both ptosis and myosis completely and reduces partially the immobility and non-reactivity to stimuli.

Dogs treated with 1.5 mg./kg. of reserpine intramuscularly show the same behavior as cats. α-Hydroxyethyl-dihydro-D-lysergamide, injected intravenously at a dose of 2–4 mg./kg., 24 hours after the injection of reserpine, abolishes both the ptosis and myosis and reduces partially the immobility and non-reactivity to stimuli.

The other products of the invention show an activity analogous to that described above.

We claim:
1. A compound of the formula:

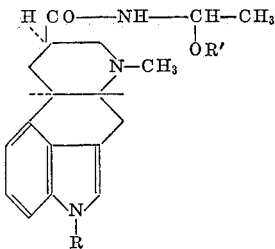

wherein
R' is selected from the group consisting of hydrogen; and methyl, and
R' is selected from the group consisting of hydrogen, β-(N-carbobenzoxy)-L-alanylhydrazide; cyclohexyl; substituted and unsubstituted saturated alkyl having from 1 to 4 carbon atoms
wherein the substituent is selected from the group consisting of hydroxy, alkoxy, chloro, phenyl, amino and acylamino
wherein the acyl is selected from the group consisting of saturated aliphatic carboxylic acid with from 1 to 4 carbon atoms, phenylcarbonic acid, benzoic acid, nicotinic acid and isonicotinic acid.

2. A stereoisomer of α-hydroxyethylamide of a compound selected from 1-methyl- and dihydro-D-lysergic acids.

3. A stereoisomer of α-methoxyethylamide of a compound selected from 1-methyl- and dihydro-D-lysergic acids.

4. A stereoisomer of α-ethoxyethylamide of a compound selected from 1-methyl- and dihydro-D-lysergic acids.

5. A stereoisomer of α-(β-hydroxyethoxy)-ethylamide of a compound selected from 1-methyl- and dihydro-D-lysergic acids.

6. A stereoisomer of α-(3'-hydroxypropoxy)-ethylamide of a compound selected from 1-methyl- and dihydro-D-lysergic acids.

7. A stereoisomer of α-(2'-methoxyethoxy)-ethylamide of a compound selected from 1-methyl- and dihydro-D-lysergic acids.

8. A stereoisomer of α-(2'-chloroethoxy)-ethylamide of a compound selected from 1-methyl- and dihydro-D-lysergic acids.

9. A stereoisomer of α-(2'-phenylethoxy)-ethylamide of a compound selected from 1-methyl- and dihydro-D-lysergic acids.

10. A stereoisomer of α-cyclohexoxy-ethylamide of a compound selected from 1-methyl- and dihydro-D-lysergic acids.

11. A stereoisomer of α-benzoxy-ethylamide of a compound selected from 1-methyl- and dihydro-D-lysergic acids.

12. A stereoisomer of α-(2'-formylamino-ethoxy)-ethylamide of a compound selected from 1-methyl- and dihydro-D-lysergic acids.

13. A stereoisomer of α-(2'-acetamido-ethoxy)-ethylamide of a compound selected from 1-methyl- and dihydro-D-lysergic acids.

14. A stereoisomer of α-(2'-benzoamido-ethoxy)-ethylamide of a compound selected from 1-methyl- and dihydro-D-lysergic acids.

15. A stereoisomer of dihydro-D-lysergic acid α-(2'-aminoethoxy)-ethylamide.

16. A stereoisomer of dihydro-D-lysergic acid α-(2'-carbobenzoxyamino-ethoxy)-ethylamide.

17. A stereoisomer of dihydro-D-lysergic acid α-(N-carbobenzoxy-L-serylhydrazide)-ethylamide.

18. A stereoisomer of dihydro-D-lysergic acid α-(2'-nicotinoylamino-ethoxy)-ethylamide.

References Cited by the Examiner

UNITED STATES PATENTS

| | | | |
|---|---|---|---|
| 2,997,470 | 8/1961 | Pioch | 260—285.5 |
| 3,113,133 | 12/1963 | Hofmann et al. | 260—285.5 |

FOREIGN PATENTS

| | | |
|---|---|---|
| 811,964 | 4/1959 | Great Britain. |

OTHER REFERENCES

Burger, "Medicinal Chemistry" (1960), p. 622.

ALEX MAZEL, *Primary Examiner.*

DONALD G. DAUS, *Assistant Examiner.*

UNITED STATES PATENT OFFICE
CERTIFICATE OF CORRECTION

Patent No. 3,272,823

September 13, 1966

Federico Arcamone et al.

It is hereby certified that error appears in the above numbered patent requiring correction and that the said Letters Patent should read as corrected below.

Column 1, formula (I) should appear as shown below instead of as in the patent:

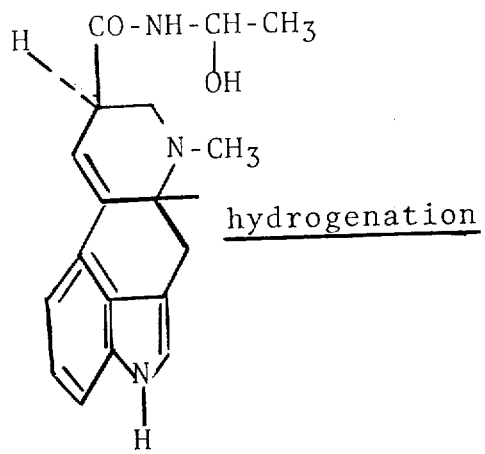

column 2, formula (V) should appear as shown below instead of as in the patent:

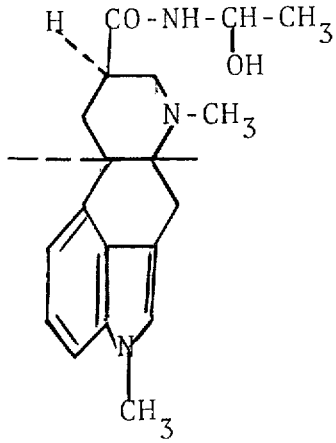

Signed and sealed this 7th day of November 1967.

(SEAL)
Attest:

EDWARD M. FLETCHER, JR.
Attesting Officer

EDWARD J. BRENNER
Commissioner of Patents